United States Patent Office 3,515,704
Patented June 2, 1970

3,515,704
PROCESS FOR THE POLYMERIZATION
OF EPISULPHIDES
Raymond T. Woodhams, Toronto, Ontario, and Bertie B. J. Wood, Georgetown, Ontario, Canada, assignors to The Dunlop Company Limited, London, England, a British company
No Drawing. Continuation-in-part of application Ser. No. 446,431, Apr. 7, 1965. This application Mar. 8, 1968, Ser. No. 711,474
Claims priority, application Great Britain, Apr. 23, 1964, 16,793/64
Int. Cl. C08g 23/00
U.S. Cl. 260—79                             10 Claims

ABSTRACT OF THE DISCLOSURE

Polymerization of at least one vicinal episulphide in the presence of an anionic compound of lithium, sodium or potassium and a compound selected from polythiol hydrocarbon compounds, polyhydyroxy hydrocarbon compounds, hydrogen sulphide and ammonia.

---

This is a continuation-in-part of Ser. No. 446,431, filed Apr. 7, 1965, now abandoned.

This invention relates to a process for the polymerization of episulphides and particularly to a process for the preparation of low molecular weight polyepisulphides (that is, polymerized episulphides) having terminal functional groups.

According to the present invention a process for the polymerization of episulphides comprises contacting at least one vicinal episulphide monomer with an anionic polymerization catalyst selected from the group consisting of the compounds of lithium, sodium and potassium, in the presence of a chain-transfer agent selected from the group consisting of polythiol hydrocarbon compounds, polyhydroxy hydrocarbon compounds, hydrogen sulphide and ammonia, and recovering polyepisulphide.

The polymerization reaction can be effected in the absence of a solvent if desired, but is preferably effected in the presence of a solvent for the one or more episulphides and for the resulting polyepisulphide. The solvent preferably does not contain a proton which can be easily abstracted by a sulphur anion, and may be an ether, an aromatic or aliphatic hydrocarbon, or a chlorinated hydrocarbon. Examples of suitable solvents are benzene, chloroform, chlorobenzene and carbon tetrachloride. Preferably a solvent which is miscible with water is used, for example, tetrahydrofuran. The amount of solvent used can vary over a wide range, for instance amounts between 0.5 ml. and 10 ml. and preferably between 0.5 ml. and 3 ml. of solvent per gram of episulphide or episulphides can be used. However, a large excess of solvent may be used if desired.

The temperature at which the polymerization reaction is effected can vary over a wide range depending on the particular episulphide or episulphides to be polymerized and the solvent if one is used, but will usually be from 0° C. up to the boiling point of the solvent. The reaction can conveniently be carried out at room temperature.

The episulphide, or a mixture of episulphides, is contacted with a polymerization catalyst to effect polymerization thereof. The polymerization catalyst must be anionic in character and examples of suitable catalysts are sodium naphthyl, sodium phenyl, lithium butyl, sodium methoxide, anhydrous sodium sulphide, sodium hydroxide, potassium hydroxide and sodium hydrosulphide. The amount of catalyst used may vary over a wide range depending upon the nature of the catalyst and the desired rate of polymerization. For example, it is necessary to use a greater amount of sodium sulphide or sodium methoxide than sodium naphthyl to obtain the same rate of polymerization. However, the amount of catalyst used will usually be from 0.5 percent to 10 percent based on the total weight of the one or more episulphides to be polymerized, preferably from 1 percent to 5 percent based on the weight of episulphide or episulphides.

If the polymerization reaction is effected in a solvent then the polymerization catalyst can be mixed with the solvent prior to addition of the episulphide or mixture of episulphides to be polymerized and the chain-transfer agent. The episulphides or mixture of episulphides can be added to the catalyst/solvent mixture simultaneously with the addition of the chain-transfer agent, or the chain-transfer agent may be added to the catalyst solution prior to the episulphide or mixture of episulphides. A particularly useful procedure is to add a small proportion, say 10 percent, of the episulphide or episulphides to the catalyst and to add the remaining episulphide or episulphides with the chain-transfer agent after about 10 minutes.

The chain-transfer agent contains a labile hydrogen atom. By a labile hydrogen atom as used in this specification there is meant a hydrogen atom which can be extracted from the chain-transfer agent by a sulphur anion. The ease with which the hydrogen atom is extracted from the chain-transfer agent by a sulphur anion determines the efficiency of the chain-transfer agent, and it is desirable in the present invention that the hydrogen atom should be easily extracted by a sulphur anion. Examples of polyhydroxy hydrocarbon chain-transfer agents which may be used are ethane diol, butane triol and glycerine. Especially preferred chain-transfer agents are polythiol hydrocarbon compounds, for example, ethane dithiol, 1,2-propane dithiol, 1,3-propane dithiol and 1,2,3-propane trithiol. It desired more than one chain-transfer agent may be employed.

The amount of the chain-transfer agent used depends upon the ease with which the labile hydrogen atom is extracted by a sulphur anion. For instance, a chain-transfer agent from which the labile hydrogen atom is extracted easily, e.g. ethane dithiol, will result in a more rapid chain-transfer reaction than a chain-transfer agent from which the labile hydrogen atom is extracted less easily. Thus, a smaller amount of the more efficient chain-transfer agent, e.g. ethane dithiol, than of the less efficient chain-transfer agent will be required to produce a polyepisulphide of a particular molecular weight. Also, the amount of chain-transfer agent used depends upon the desired molecular weight of the polyepisulphide to be prepared; for instance, the lower the desired molecular weight of the polyepisulphide the greater will be the amount of chain-transfer agent required. This phenomenon is largely owing to the finding that by the method of this invention the rate of chain-transfer is much greater than the rate of propagation.

Usually the amount of chain-transfer agent used will be from 1 percent to 30 percent by weight based on the total weight of episulphide or episulphides to be polymerized. The process of the invention is particularly suitable for the preparation of polymers which are liquids (low molecular weights) at room temperature. Polymers of molecular weight as low as 500 or less can be prepared.

The process of the present invention can be used to effect the polymerization of a wide variety of episulphides. Examples of suitable episulphides are alkylene sulphides, for example, ethylene episulphide, propylene episulphide, butylene episulphides, octene-1-episulphide, octene-2-episulphide and decane episulphides; unsaturated episulphides, for example, butadiene mono-episulphide, 1,5-hexadiene mono-episulphide and allyl thioglycidyl ether; and cyclo-aliphatic episulphides, for example, cyclobutene episulphide and cyclohexene episulphide. Derivatives of the above episulphides may also be polymerized, for instance episulphides having an alkyl, aryl or halogen substituent attached to a carbon atom of the molecular chain. Mixtures of two or more episulphides may be interpolymerized by the process of the present invention.

The process of the present invention may be used to prepare polyepisulphides having at least two terminal reactive groups per molecule, at least one of which is usually a thiol group. The other terminal reactive group or groups will depend upon the nature of the chain-transfer agent used, for example, if ammonia is used as the chain-transfer agent, said other terminal reactive group may be an amine group. When a trifunctional chain-transfer agent is employed, the polyepisulphide usually has an average of more than 2 terminal reactive groups per mole.

The polyepisulphides can be cured by heating them in the presence of a curing agent such as an oxide or peroxide of a metal of the B sub-groups of Groups I to IV and the A sub-group of Group V of the Mendeléeff Periodic Table. Other curing agents which may be used are inorganic oxidising agents such as zinc chromate, lead chromate and ammonium chromate, and quinonoid compounds such as quinone and p-quinone dioxime. The cured polymers have a high resistance to attack by ozone and by organic solvents.

The curing temperature should be above the softening temperature of the polyepisulphide, but below the degradation temperature and will usually be from 250° F. to 500° F., preferably from 250° F. to 350° F. The amount of the curing agent will usually be from 5 to 25 parts by weight and preferably from 5 to 15 parts by weight per 100 parts by weight of the polyepisulphide. Reinforcing fillers, antioxidants and plasticizers may be included in the compositions.

The invention is illustrated by the following examples in which "EtS"=ethylene episulphide, "PrS"=propylene episulphide, "BuS"=butadiene mono-episulphide, "AGS"=allyl thioglycidyl ether, "ED"=ethane dithiol, "G"=glycerine, "PT"=1,2,3-propane trithiol, "EtOH"= ethanol, "THF"=tetrahydrofuran, "% Conv."=percentage conversion, "SH/mole"=No. of primary thiol groups/molecule, "% Ash"=percentage of residual ash, and "M.W."+molecular weight of polymer.

EXAMPLE I

This example illustrates the modification of the molecular weight of polymers and copolymers of episulphides, using sodium naphthyl as the polymerization catalyst and ethane dithiol as the chain-transfer agent.

Into a clean dry vessel, blanketed with nitrogen, were added 50 ml. of tetrahydrofuran which had been refluxed over calcium hydride and distilled prior to use. A solution of sodium naphthyl in tetrahydrofuran, containing 0.0005 gram mole of sodium naphthyl per ml. of tetrahydrofuran, was added until a permanent-green colour was obtained. A further 5 ml. of the sodium naphthyl solution (0.0025 gram mole) and 5 grams of propylene episulphide were added. The colour of the solution changed from green through yellow to orange and after 10 minutes a further 45 grams of propylene episulphide were added. The mixture was allowed to polymerize for 6 hour after which time the polymer was precipitated by the slow addition of N-hydrochloric acid in a 1:1 water: methanol mixture. The precipitate was washed twice with a 1:1 water:methanol mixture and then dried. The molecular weight of the polymer was determined by vapour phase osmometry. The percentage conversion of propylene episulphide to poly(propylene sulphide) was also determined. The results are shown in Table I below.

The above procedure was repeated 7 times using the amounts of monomer given in Table I. In Experiments 3 to 8, ethane dithiol in the amounts specified in Table I, was added as chain-transfer agent. The ethane dithiol was added with the further amount of propylene episulphide, and in Experiments 2 and 6 to 8, the ethylene episulphide was also added with the further amount of propylene episulphide. The molecular weight of each polymer, and the percentage conversion of episulphide after 6 hours were determined. The results are shown in Table I.

TABLE I

| Expt. No. | PrS (ml.) | EtS (ml.) | ED (gm.) | Percent Conv. | M.W. |
|---|---|---|---|---|---|
| 1 | 50 | 0 | 0 | 90 | 5,800 |
| 2 | 37 | 9 | 0 | 100 | 7,100 |
| 3 | 50 | 0 | 2.5 | 89 | 1,200 |
| 4 | 50 | 0 | 5.0 | 82 | 740 |
| 5 | 50 | 0 | 7.5 | 76 | 680 |
| 6 | 37 | 9 | 2.5 | 95 | 1,450 |
| 7 | 37 | 9 | 5.0 | 71 | 740 |
| 8 | 37 | 9 | 7.5 | 63 | 660 |

These results show that use of a chain-transfer agent such as ethane dithiol reduces the molecular weight of the polyepisulphide below the molecular weight of the polyepisulphide prepared in the absence of a chain-transfer agent.

EXAMPLE II

This example illustrates the use of hydrogen sulphide as the chain-transfer agent.

The procedure of Example I was repeated 6 times but using hydrogen sulphide as the chain-transfer agent instead of ethane dithiol. The details are shown in Table II.

TABLE II

| Expt. No. | PrS (ml.) | EtS (ml.) | H₂S (gm.) | Percent Conv. | M.W. |
|---|---|---|---|---|---|
| 1 | 50 | 0 | 0 | 95 | 8,400 |
| 2 | 37 | 9 | 0 | 95 | 13,000 |
| 3 | 50 | 0 | 2 | 90 | 3,300 |
| 4 | 50 | 0 | 4 | 85 | 2,500 |
| 5 | 37 | 9 | 2 | 85 | 3,400 |
| 6 | 37 | 9 | 4 | 85 | 2,700 |

These results show that low molecular weight polyepisulphides can be prepared using hydrogen sulphide as the chain-transfer agent. By comparing these results with the results of Example I, it will be seen that ethane dithiol is a slightly more effective chain-transfer agent than is hydrogen sulphide.

EXAMPLE III

This example illustrates the use of a polyhydroxy compound as the chain-transfer agent.

The procedure given in Example I was repeated 7 times but using the amounts of monomer and chain-transfer agent given in Table III below:

TABLE III

| Expt. No. | PrS (ml.) | EtS (ml.) | G (mg.) | Percent Conv. | M.W. |
|---|---|---|---|---|---|
| 1 | 50 | 0 | 0 | 92 | 5,300 |
| 2 | 37 | 9 | 0 | 76 | 6,100 |
| 3 | 50 | 0 | 2.5 | 83 | 2,600 |
| 4 | 50 | 0 | 5.0 | 71 | 1,900 |
| 5 | 50 | 0 | 10.0 | 77 | 2,100 |
| 6 | 37 | 9 | 10.0 | 54 | 1,800 |
| 7 | 37 | 9 | 20.0 | ---- | 1,200 |

These results show that glycerine can be used as chain-transfer agent.

EXAMPLE IV

This example illustrates the use of other anionic catalysts to prepare polyepisulphides of controlled molecular weight.

In a clean dry vessel, the monomer charge in the amounts given in Table IV below and the chain-transfer agent were mixed with the catalyst in 20 ml. of tetrahydrofuran and allowed to polymerize for 18 hours at 23° C. under a nitrogen atmosphere. The polymers were precipitated, washed, and dried as described in Example I and their molecular weights were determined.

The details of the polymerization are shown in Table IV–A and the percentage conversion and molecular weights of the polymers are shown in Table IV–B:

TABLE IV-A

| Expt. | NaOMe (gm.) | Na₂S (gm.) | NaHS (gm.) | PrS (ml.) | EtS (ml.) | ED (gm.) | H₂S (gm.) | G (gm.) |
|---|---|---|---|---|---|---|---|---|
| 1 | 1 | 0 | 0 | 20 | 0 | 0 | 0 | 0 |
| 2 | 1 | 0 | 0 | 18 | 2 | 0 | 0 | 0 |
| 3 | 1 | 0 | 0 | 20 | 0 | 0 | 1 | 2 |
| 4 | 1 | 0 | 0 | 18 | 2 | 0 | 1 | 2 |
| 5 | 0 | 1 | 0 | 22 | 0 | 0 | 0 | 0 |
| 6 | 0 | 1 | 0 | 19 | 3 | 0 | 0 | 0 |
| 7 | 0 | 1 | 0 | 22 | 0 | 2 | 0 | 0 |
| 8 | 0 | 1 | 0 | 19 | 3 | 2 | 0 | 0 |
| 9 | 0 | 0 | 1 | 20 | 2 | 0 | 0 | 0 |
| 10 | 0 | 0 | 1 | 20 | 2 | 2 | 0 | 1 |

TABLE IV-B

| Expt. No. | Percent Conv. | M.W. |
|---|---|---|
| 1 | 90 | 8,400 |
| 2 | 73 | 13,000 |
| 3 | 100 | 1,550 |
| 4 | 100 | 2,300 |
| 5 | 60 | 6,300 |
| 6 | 80 | 9,800 |
| 7 | 100 | 1,250 |
| 8 | 100 | 1,270 |
| 9 | 60 | 8,380 |
| 10 | 50 | 1,260 |

EXAMPLE V

This example describes the preparation of low molecular weight unsaturated polyepisulphides. The procedure outlined in Example II was repeated twice, using the amounts of monomer given in Table V below.

The molecular weights of the polymers and the percentage conversion of episulphide are shown in Table V.

TABLE V

| Expt. No. | PrS (ml.) | AGS (ml.) | BuS (ml.) | H₂S (gm.) | Percent Conv. | M.W. |
|---|---|---|---|---|---|---|
| 1 | 20 | 2 | 0 | 1 | 100 | 5,450 |
| 2 | 20 | 0 | 2 | 1 | 100 | 1,900 |

Infra-red analyses of the polymers indicated that in Expt. No. 1 the polymer contained pendant allyl groups, and in Expt. No. 2 the polymer contained pendant vinyl groups and some cis-unsaturation in the polymer chain, indicating that some 1,4-polymerization of the butadiene monoepisulphide had occurred.

The polymers obtained from Expts. 1 and 2 showed the infra-red absorbances for terminal thiol groups.

EXAMPLE VI

This example shows how the molecular weight of the polymer varies with the proportions of monomer, catalyst and chain-transfer agent.

Potassium hydroxide pellets were dissolved in ethanol and a solution of ethane dithiol in tetrahydrofuran was added dropwise slowly with heating to reflux the solvent under a nitrogen atmosphere. 30 minutes after the ethane dithiol had been added, a solution of propylene episulphide in tetrahydrofuran was added dropwise slowly and the solvent was refluxed for 1 hour when the monomer addition was complete.

The resulting polymer solution was stirred with anhydrous sodium sulphate and/or activated molecular sieves to remove water formed during the reaction and was then treated with hydrogen chloride gas to remove potassium. The product was centrifuged and the polymer was dried under vacuum in a rotary evaporator.

Details of five experiments using the above procedure and details of the resulting polymer are given in Table VI.

TABLE VI

| | 1 | 2 | 3 | 4 | 5 |
|---|---|---|---|---|---|
| KOH (gm.) | 13.80 | 6.35 | 7.68 | 4.20 | 3.10 |
| EtOH (ml.) | 25 | 25 | 30 | 25 | 25 |
| ED (gm.) | 11.35 | 5.95 | 5.26 | 4.72 | 3.48 |
| THF 1 (ml.) | 50 | 50 | 60 | 50 | 50 |
| PrS (gm.) | 70 | 70 | 70 | 70 | 70 |
| THF 2 (ml.) | 70 | 70 | 85 | 70 | 70 |
| Percent Conv | 90 | 100 | 95 | 90 | 90 |
| M.W. (Mn) | 920 | 1,400 | 1,640 | 1,750 | 3,000 |
| SH/mole | 1.65 | 1.36 | 1.82 | 1.49 | 1.48 |
| Percent Ash | 0.07 | 0.10 | | 0.01 | 0.01 |

"THF 1" was the solvent used to dissolve the ethane dithiol, and "THF 2" was the solvent used to dissolve the propylene episulphide.

EXAMPLE VII

The procedure of Example VI was repeated except that benzene was used in place of tetrahydrofuran as solvent and the reaction product was treated with concentrated sulphuric acid instead of with hydrogen chloride gas.

The amounts of the ingredients were:
KOH=4.25 gm.;
EtOH=25 ml.;
ED=2.80 gm.;
PrS=70 gm.; and
benzene=140 ml. (total).

The SH/mole was 1.47 and the measured Mn was 2145.

EXAMPLE VIII

This example illustrates the bulk polymerization of episulphides.

Ethylene episulphide and/or propylene episulphide were polymerized in the presence of 50% aqueous KOH and a chain-transfer agent being ethane dithiol and/or 1,2,3,-propane trithiol, and in the absence of solvent. The results are given in Table VIII.

TABLE VIII

| | 1 | 2 | 3 | 4 |
|---|---|---|---|---|
| ED (gm.) | 64.5 | 23.6 | 0 | 28.2 |
| PT (gm.) | 0 | 0 | 6.7 | 14.0 |
| EtS (gm.) | 0 | 125 | 0 | 225 |
| PrS (gm.) | 1,425 | 370 | 100 | 675 |
| 50% KOH aq (gm.) | 3.4 | 0.8 | 0.1 | 0.2 |
| Percent Conv | 95 | ca. 100 | ca. 100 | ca. 100 |
| M.W. (Mn) | 2,180 | 2,100 | | 1,950 |
| SH/mole | 1.72 | 1.76 | 2.23 | 1.73 |

In Experiments 2 to 4 the reaction product was neutralised using acetic acid and in Experiment 1 no neutralisation was performed. The copolymer prepared in Experiment 2 comprised 25% EtS and that of Experiment 3 comprised 23% EtS.

Having now described our invention, what we claim is:

1. A process for polymerizing episulphide monomers which comprises contacting at least one vicinal episulphide monomer with an anionic polymerization catalyst selected from the group consisting of sodium naphthyl, sodium phenyl, lithium butyl, sodium methoxide, anhydrous sodium sulphide, sodium hydroxide, potassium hydroxide and sodium hydrosulphide, in the presence of a chain-transfer agent selected from the group consisting of ethane dithiol, 1,2-propane dithiol, 1,3-propane dithiol, 1,2,3,-propane trithiol, ethane diol, glycerine, butane triol, hydrogen sulphide and ammonia, and recovering polyepisulphide.

2. A process according to claim 1 in which the amount of the chain-transfer agent is from 1% to 30% by weight based on the total weight of episulphide or episulphides to be polymerized.

3. A process according to claim 1 in which the polymerization reaction is carried out in an inert organic solvent for the episulphide or episulphides.

4. A process according to claim 1 in which the polymerization reaction is carried out at a temperature of from 0° C. up to the boiling point of the solvent.

5. A process according to claim 1 in which the amount of catalyst is from 0.5% to 10% by weight based on the total weight of episulphide or episulphides to be polymerized.

6. A process according to claim 3 in which the amount of the solvent is from 0.5 ml. to 10 ml. per gram of episulphide or episulphides to be polymerized.

7. A process according to claim 3 in which the solvent is tetrahydrofuran.

8. A process according to claim 1 in which the chain-transfer agent is selected from the group consisting of ethane dithiol, 1,2-propane dithiol, 1,3-propane dithiol and 1,2,3,-propane trithiol.

9. A process according to claim 1 in which the chain-transfer agent is ethane dithiol.

10. A process according to claim 1 in which the chain-transfer agent is selected from the group consisting of ethane diol, butane triol and glycerine.

References Cited

UNITED STATES PATENTS

| | | | |
|---|---|---|---|
| 3,317,489 | 5/1967 | Sander | 260—79 |
| 3,317,920 | 5/1967 | Sander | 260—79 |
| 3,222,324 | 12/1965 | Brodoway | 260—79.7 |

DONALD E. CZAJA, Primary Examiner

M. I. MARQUIS, Assistant Examiner

U.S. Cl. X.R.

260—79.7, 609